Dec. 22, 1959   E. J. HERBENAR   2,917,910
COUPLING
Filed July 13, 1956
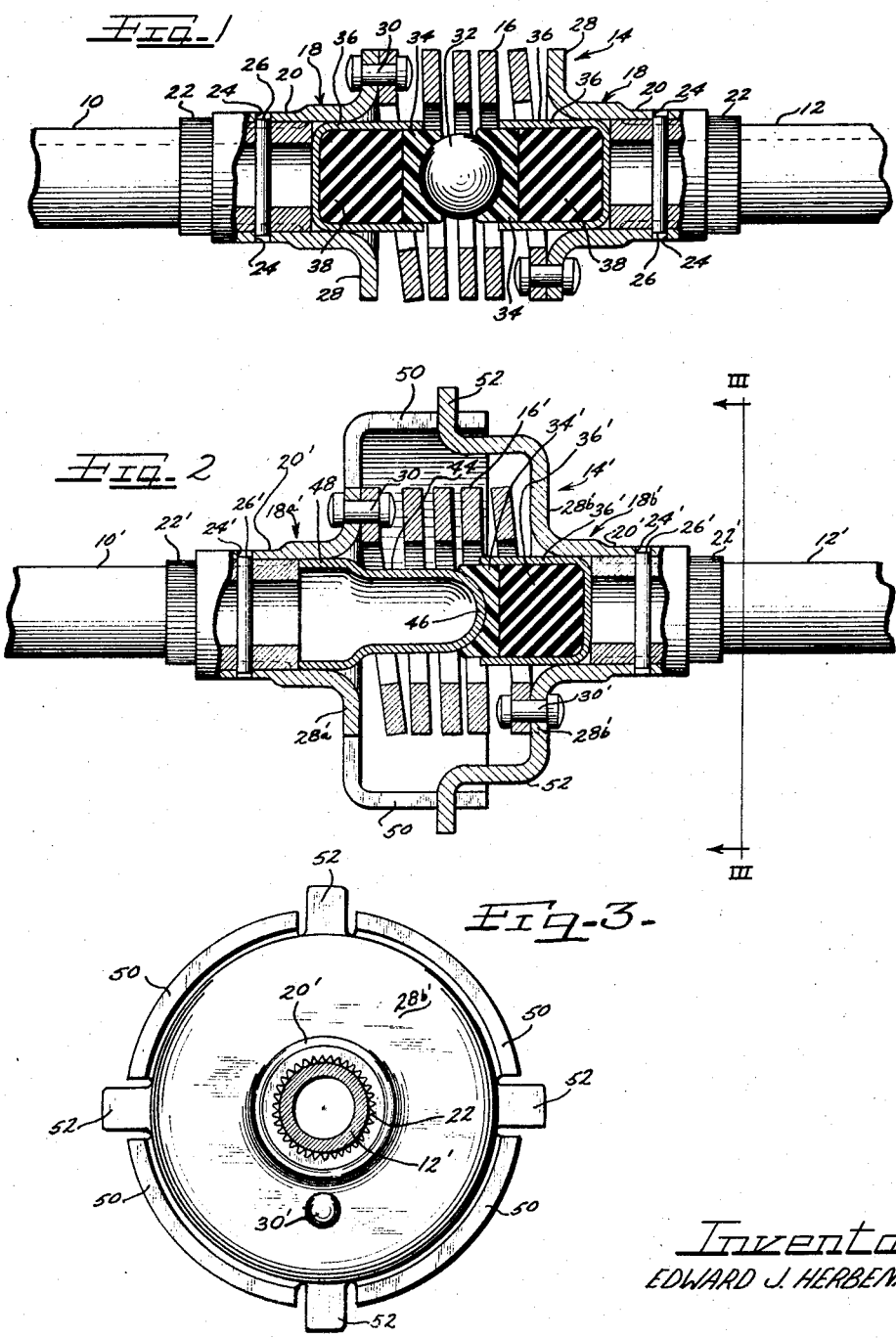
Inventor
EDWARD J. HERBENAR

United States Patent Office 2,917,910
Patented Dec. 22, 1959

2,917,910

COUPLING

Edward J. Herbenar, Detroit, Mich., assignor to Thompson Ramo Wooldridge, Inc., a corporation of Ohio Application July 13, 1956, Serial No. 597,628

2 Claims. (Cl. 64—15)

This invention relates to flexible couplings for shafting, and more particularly to flexible couplings embodying a torque-sustaining torsion spring as a flexible working member. A desired application is for steering gear shafts, but other uses will be apparent to those skilled in the art.

A general object of the present invention is to provide a novel flexible coupling which is of relatively simple and economical construction yet which has advantageous operating characteristics.

A further object is to provide a new and improved flexible coupling of torsion spring-type which has advantageous means to maintain a constant pivot point to maintain aligned the adjacent ends of the connected shafts.

Another object is to provide means to resiliently cushion axial shock loads imparted on either the driving or the driven shaft.

A further object is to provide a spring-type flexible coupling having means to control axial deflection of the spring when excessive torque is being transmitted.

A further object is to provide a spring-type flexible coupling of novel construction having novel means to pre-load the spring.

These and other and more particular objects, features and advantages of the present invention will be readily apparent from the following description of illustrative embodiments thereof, taken in conjunction with the accompanying drawings, in which:

Figure 1 is a longitudinal view, with parts in section and parts broken away, illustrating a flexible coupling according to principles and concepts of the present invention;

Figure 2 is a longitudinal view, generally corresponding to that of Fig. 1, but illustrating a modified coupling; and Figure 3 is a transverse cross-sectional view of the coupling shown in Fig. 2, taken generally along the line III—III of Fig. 2.

In Figure 1, the illustrated embodiment of the flexible coupling includes a driving shaft 10 and a driven shaft 12 interconnected by a flexible coupling 14 according to principles and concepts of the present invention. The coupling 14 includes a helical or torsion spring 16, the ends of which respectively are connected to flanged fittings 18 or connector sleeves respectively connected to the driving and driven shafts.

Spring 16 is adapted to transmit the driving torque between the shafts to drivingly interconnect them, and its flexibility provides the desired flexibleness to the coupling to accommodate angular mis-alignment and relative angular deflection of the driving and driven shafts.

The fittings 18 are shown as formed from heavy metal, providing a generally cylindrical body portion 20 having internal splines adapted to engage associated splines 22 carried on the driving and driven shafts 10—12. For axially locating the fittings 18 with respect to the shafts 10—12, the fittings 18 are provided with locating holes 24 adapted to register with associated openings provided in the shafts 10—12, and through those aligned openings are passed holding pins 26. The body 20 of the fittings 18 extends past the end of the associated shaft, and in a region spaced from the end of the shaft, the body 20 is formed outwardly to provide a radially extending flange 28. The flange 28 provides a means for connection of the spring 16 to the fitting 18, as by the rivet 30.

The present invention provides centering means disposed along the bore of the helical spring to maintain aligned the ends of connected shafts but permit angular deflection of their axes.

Thus, according to the present invention, there is illustrated in the embodiment of Figure 1 a centering member such as a ball 32 located along the bore of the spring 16. The ball 32 is seated in the opposed, concave faces of supporting members 34. Those supporting members 34 are desirably formed from resilient plastic material. The supports 34 are carried by a cup or a cup-like member 36 which fits within the bore of the body 20 of the fitting 18, and which seats against the end of the associated shaft 10—12. A resilient body such as a rubber or rubber-like mass 38 is shown as carried within the cup 36 between the cup-bottom and the supporting member 34.

It will be observed that the centering means is supported in fixed axial relation to the adjacent shafts but permits angular displacement of spaced portions of the centering means to accommodate angular deflection of the coupling.

In the above-described construction, the helical spring 16 is designed to transmit a predetermined torque in either direction without angular deflection. Any torque in excess of the design load will be carried by the spring in torsional deflection, resulting in the coupling acting as a torsional shock absorber.

It will be seen that a flexible coupling constructed as above described maintains a constant pivot point for the connected shafts, to maintain their adjacent ends aligned regardless of angular deflection of the shafts as permitted by the coupling. Axial shock loads imparted on either the driving shaft 10 or the driven shaft 12 are absorbed or cushioned. Axial deflection of the spring during excessive torsional load thereof is controlled. The spring is preloaded to impart desired operating characteristics.

In Figs. 2 and 3, since the principles and concepts of the present invention are shown as illustrated in a flexible coupling 14' which in many respects is identical with the flexible coupling 14 exemplified in Figure 1, similar but primed reference numerals are employed to identify corresponding parts of the two embodiments, and the description of such parts given in connection with the first embodiment applies to the modified form illustrated in Figure 2, except as otherwise noted.

Accordingly, in the embodiment illustrated in Figure 2, there is shown a driving shaft 10' and a driven shaft 12' interconnected by the flexible coupling 14' embodying a helical spring 16' connected as by rivets 30' to shaft-fittings 18a' and 18b'.

The centering means, as shown in the embodiment illustrated in Fig. 2, is different as that shown in Fig. 1 in that there is a cup 36', rubber mass 38', and support 34' associated with only one of the shafts, here shown as the driven shaft 12'. In contrast to the embodiment illustrated in Fig. 1, in Fig. 2 for association with the driving shaft 10' there is shown a cup-like member such as the drawn sleeve 44 having a rounded centering nose 46 which engages the support 34' in a centeringly interfitting manner, rather than a separate ball member 32 as in Fig. 1. The sleeve 44 extends from its rounded nose 46 in a generally cylindrical configuration to provide a body portion 48 which fits within the bore of the fitting 18a' in a manner similar to the fit of cup 36 of Fig. 1 in fitting 18. The body portion 48 of the sleeve 44 as shown seats against the end of the driving shaft 10'.

It will be seen that the invention illustrated in Fig. 2 provides substantially similar characteristics as those described in connection with the embodiment of Fig. 1. That is, it maintains a constant pivot point for the shafts 10'—12' to maintain their ends aligned. It absorbs or cushions axial shock load imparted on either the driving shaft 10' or the driven shaft 12'. It controls axial deflection of the spring 16' when excessive torque is being transmitted. It provides a means for pre-loading the helical spring 16'.

Figures 2 and 3 also illustrate an over-travel safety device which limits the torsional deflection of the spring 16', and which also acts as a safety device in the event of spring failure. Thus, as shown, the fittings 18a' and 18b' carry arms 50—52, respectively, which project toward each other and into axially overlapping relationship, so that relative rotation of the two shafts cause arms 50—52 to come into blocking engagement to prevent further relative rotation of the two fittings 18a' and 18b' and their respective shafts 10'—12'. As shown, the arms 50—52 are formed as integral extensions of flanges 28a' and 28b', respectively, of the fittings 18a' and 18b'. The arms 52 are shown as formed generally as a spider member which interfits in notches of a cup shaped member notched to provide the arms 50. It is to be observed that the arms 50—52 do not interfere with the flexibility of the coupling, that is, they are spaced from the spring 16' to permit substantial angular deflection of the ends thereof without interference.

The over-travel, or rotation-limiting safety means such as the arms 50—52 may be utilized in connection with the invention as illustrated in the embodiment of Figure 1.

It will bet thus seen that the principles and concepts of the present invention provide a flexible coupling embodying a helical spring, having novel means for centering the adjacent ends of the shafts connected by the coupling, and providing advantageous characteristics of shock-cushioning, control of axial deflection of the spring, and pre-load of the spring, as well as providing over-travel safety means to limit torsional deflection of the spring. The coupling may be quite flexible, and provide a driving connection between driving and driven shafts which may be substantially out of alignment. The coupling may be manufactured and assembled with relative economy, and will provide useful service for a prolonged period of effective operation.

It will thus be seen from the foregoing description, of the invention according to these illustrated embodiments, considered in conjunction with the accompanying drawings, that the present invention provides a new and flexible coupling having the desired advantages and characteristics, and accomplishing its intended objects, including those hereinbefore pointed out and others which are inherent in the invention as described.

It will be understood that modifications and variations may be effected without departing from the scope of the novel concepts of the present invention.

I claim as my invention:

1. A flexible coupling for first and second shafts, comprising, a torsion spring interconnecting the shafts, a centering ball member supported in the bore of said spring, resilient supporting members having concave faces which seat said ball member, cup members receiving said supporting members, and means supporting each of said cup members from the associated shaft.

2. A flexible coupling for first and second shafts, comprising, a torsion spring interconnecting the shafts, a centering ball member supported in the bore of said spring, resilient supporting members having concave faces which seat said ball member, cup members receiving said supporting members, and means supporting each of said cup members from the associated shaft, there being disposed in each cup member a resilient mass resiliently supporting said supporting members.

References Cited in the file of this patent

UNITED STATES PATENTS

| | | |
|---|---|---|
| 1,348,184 | Rayfield | Aug. 3, 1920 |
| 1,507,921 | Karge et al. | Sept. 9, 1924 |
| 1,662,223 | Werner et al. | Mar. 13, 1928 |
| 1,705,984 | Lindsay | Mar. 19, 1929 |
| 1,719,411 | Weidenbach | July 2, 1929 |
| 2,245,764 | Dome et al. | June 17, 1941 |
| 2,626,000 | Yergens | Jan. 20, 1953 |
| 2,708,351 | Gensheimer | May 17, 1955 |
| 2,782,020 | McCandless | Feb. 19, 1957 |